Patented Mar. 26, 1940

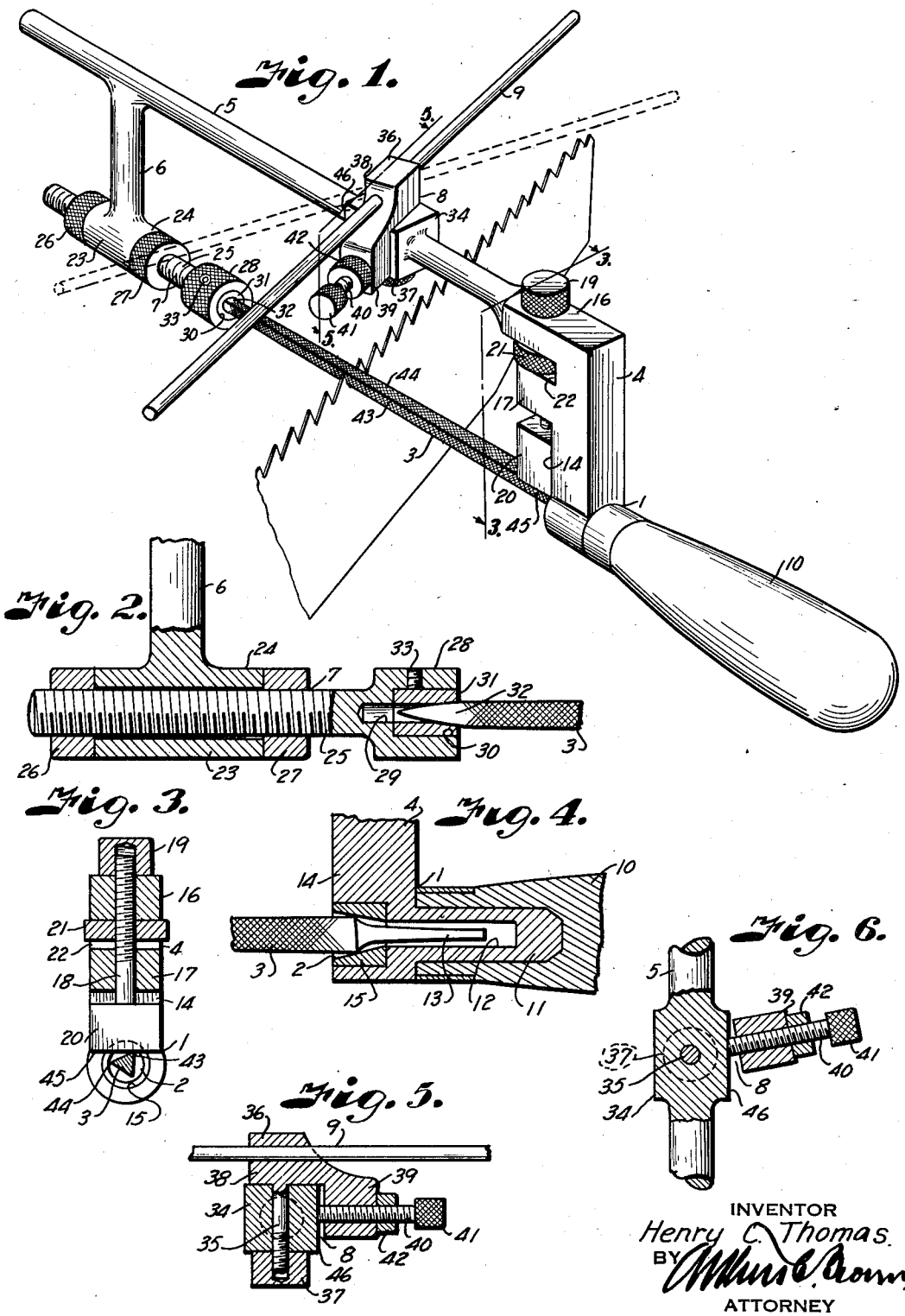

2,194,464

UNITED STATES PATENT OFFICE 2,194,464

SAW-SHARPENING DEVICE

Henry C. Thomas, Kansas City, Mo.

Application November 8, 1937, Serial No. 173,339

2 Claims. (Cl. 76—36)

This invention relates to saw-sharpening devices and more particularly to a device of that character comprising a file or the like mounted in a frame or other member whereby the file may be reciprocated relative to the teeth of a saw for sharpening the saw.

The principal objects of the present invention are to provide a saw-sharpening device which may be reciprocated at a constant angle relative to the teeth of a saw and wherein the file thereof may be variably canted to present the proper angle of the file relative to the teeth of the saw for obtaining the proper pitch and cutting angles of inclination for the teeth of the saw.

Other important objects of the present invention are to provide means within the frame for mounting the file whereby the file may be centered relative thereto; to provide means in the frame for canting the file and maintaining same in properly canted position; to provide for mounting the file in such a manner as to protect it against breakage; to provide means on the frame whereby the device may be maintained in alignment with the saw; to provide means for adjusting the aligning means whereby the proper angle of the complete device relative to the longitudinal plane of the saw may be maintained in operating same for obtaining the proper angles of the sharpened teeth; and to provide constant adjustments for the file and frame relative to saw and teeth thereof.

In accomplishing these and other objects of the present invention, I have provided improved details of structure, the preferred form of which is illustrated in the accompanying drawing, wherein:

Fig. 1 is a perspective view of a saw-sharpening device embodying the features of the present invention, which is shown as it is being applied to a saw for sharpening same.

Fig. 2 is a detail perspective view of the adjustable support for one end of the file.

Fig. 3 is a vertical cross-section on the line 3—3, Fig. 1.

Fig. 4 is a vertical fragmentary cross-section through a portion of the handle member illustrating the seat for the tang end of the file.

Fig. 5 is a vertical cross-section through the file aligning device taken on the line 5—5, Fig. 1.

Fig. 6 is a plan view partly in cross-section through the saw aligning device.

Referring more in detail to the drawing:

The present invention generally consists of a frame having a handle 1 provided with a seat 2 for one end of a file 3, a post 4 being mounted on the handle and having means for operating on one end of the file, said post having a lateral extension 5 provided with a post 6 having an adjusting mechanism 7 mounted thereon for adjustably mounting the other end of the file. A device 8 is also provided on the extension 5 in spaced relation to the ends thereof for mounting an adjustable sight gauge bar 9 for aligning the frame in proper relation to the teeth of a saw to be sharpened.

The handle 1 is particularly illustrated in Fig. 4 and preferably consists of a gripping member 10 provided with a central bore at the inner end thereof for seating a lug 11 extending rearwardly thereinto from the post 4. The lug 11 is also provided with a bore 12 for receiving the tang end 13 of the file 3. The post 4 is provided with a recess extending inwardly from the front face 14 thereof in which a sleeve or ring of a suitable material is mounted, for example, the brass ring 15 which is preferably pressed into the recess, the ring 15 in turn being provided with a bore which tapers inwardly from the outer face thereof and terminates at the surface of the bore in the lug 12.

The upper end of the post 4 is provided with a substantially rectangular forwardly extending lug 16 which terminates in the extension 5. Formed integrally with the post 4 in downwardly spaced relation to the top lug 16 is a forwardly extending lug 17, the lugs 16 and 17 being provided with aligned substantially vertical bores for receiving a threaded shank 18, as particularly shown in Fig. 3. The threaded upper end of the shank 18 is mounted in a knurled nut or the like 19 and on its lower end is mounted a block 20 of a material preferably harder than the rest of the structure, for example, tempered steel. The under face of the block is adapted to be engaged by certain of the corners of the file 3 when the file is turned in its mounting as later described, for retaining the file in set position after the file has been adjusted. A lock nut 21 is also mounted on the threaded shank 18 within the space 22 between the lugs 16 and 17, whereby, when the block 20 is adjusted by manipulation of the nut 19, such block may be locked in desired position by turning the nut 21 on the shank to contact the under face of the lug 16.

The mechanism 7 for adjusting the length of the frame relative to the file 3 preferably consists of a boss 23 on the downwardly extending post 6, which boss is provided with longitudinally extending ends 24 preferably extending in parallel relation to the extension 5 as particularly shown in Fig. 2. The boss 23 is provided with a central bore through which a screw is inserted, which screw is provided with a pair of lock nuts 26 and 27 at the opposite ends of the boss 23. The screw 25 has an enlarged inner head 28 provided with a central bore 29 and a counter bore 30. A sleeve or ring 31 of relatively soft material, preferably formed of soft brass or the like, is mounted, as by pressing, in the counter bore of the head 28 for receiving the tip end 32 of the file 3, the ring preferably being retained in position in the counterbore by a fastening device such as the set screw 33. The enlarged head 28 of the screw 25 is preferably knurled to facilitate holding the screw relative to the boss 23 for adjusting the frame as to length relative to the file and for gripping the file within the ring 31 at the inner end of the screw. For example, when it is desired to shorten the space between the posts 4 and 6 for gripping the file the lock nut 26 may be gripped and the nut 27 or head 28 turned in an anti-clockwise direction to draw the screw 25 to the right or toward the post 4, the head 28 may then be held and the lock nut 27 threaded back into engagement with the boss 23 to retain the screw in adjusted position.

The device 8 for aligning the frame, as distinguished from the file, relative to a saw to be sharpened, preferably consists of a block 34, as particularly shown in Figs. 5 and 6, preferably integrally mounted on the extension 5. The block 34 is provided with a central vertical bore for pivotally receiving a threaded shank 35 mounted on a boss 36, the shank 35 being provided with threads on its lower end for receiving a knurled nut 37 by which the boss may be maintained in adjusted angular position relative to the block 34 by merely turning the nut 37 into engagement with the under face of the block 34. The boss 36 consists of a head portion 38 in which the gauge bar 9 is mounted for lateral extension through an opening therein and further consists of a downwardly extending member 39 which overhangs the block 34 and which is preferably of substantially the form of the head portion 38, the member 39 being joined to the head portion as shown in spaced relation to a side face of the block when the shank 35 is mounted thereon. The overhanging member 39 is provided with a bore for receiving a threaded pin 40 having a knurled head 41. A lock nut 42 is also provided on the pin 40 between the head 41 and the outer face of the member 39 whereby the pin may be locked in position when adjusted relative to the block 34 by rotating the head 41 to draw it toward or away from the member 39.

In operating a device constructed as described, the tang end of a conventional three-cornered file is mounted in the handle 10 in such a manner that the body portion of the file adjacent said tang end is engaged in the soft ring 15. The head 28 is then moved toward the handle to effect engagement of the tip end of the file in the soft ring 31.

The file may then be placed between adjacent teeth of a saw to be sharpened for aligning the face of the file employed for cutting with the cutting edge of one of said adjacent saw teeth. The cutting face of the file being so arranged, the file is then fixed in said position by manipulation of the lock nuts 26 and 27. The block 20 is then lowered into engagement with the uppermost corner of the file, as shown at 43 in Fig. 3, and locked in such position by the lock nut 21. The file is then "set."

The cutting angle of the edges of the teeth, as distinguished from the angle between adjacent teeth, controls the position of the gauge bar 9 relative to the frame. In arriving at this cutting angle, the file is positioned transversely of the saw at an angle to the longitudinal plane thereof corresponding to the angle to be given the cutting edges of the saw teeth. The boss 36 is then rotated on the block 34 to position the gauge bar 9 in parallel relation to the longitudinal plane of the saw. The pin 40 is then threaded into engagement with the block 34 and the gauge bar 9 is thus "set."

The operator may then sharpen alternate teeth of the saw beginning with the first tooth, for example, and maintains the proper cutting angle for the edges of the teeth by sighting against the gauge bar and saw to maintain both in parallel relation while the file is reciprocated to sharpen the teeth.

In sharpening alternate teeth of the saw beginning with the second tooth, it is sometimes desirable to reverse the frame, and in so doing the angle of the cutting face of the file is reversed relative to the teeth to be sharpened. The lock nuts 26 and 27 should then be loosened and the file rotated axially to the right, as in Fig. 3, and as limited by the block 20, to reverse the cutting angle, the angle in its new position corresponding to the desired first angle but in reverse relation thereto.

With the frame and file reversed, it is necessary to also reverse the gauge bar 9. This is accomplished by merely loosening the lock nut 37 and rotating the boss, for example in a clockwise direction from the position shown in Fig. 6, as far as possible as limited by engagement of the pin 40 with the block 34. The lock nut 37 is then tightened and the gauge bar is set in reversed relation to its original position and in corresponding relation to the new position of the file and frame.

The operation may then be resumed to sharpen the second alternate series of teeth to complete the sharpening operation on the saw.

By this expedient, the operator of the device, in reciprocating the file to sharpen the teeth of the saw, may maintain the frame in adjusted alignment with the saw by merely watching the position of the bar relative to the saw, i. e., by keeping the bar in parallel relation to the axis or plane of the saw during the filing or sharpening operation. Further, the cutting edges of the saw may be given the proper angles and pitches by simply adjusting the file in the frame.

The principal advantages of a device of the character described, over others heretofore available for this purpose, are that a plurality of angular positions are readily available for the file relative to the teeth of the saw. The file is prevented from breaking due to its relatively resilient mounting in the soft rings of the frame. The device may be easily and quickly positioned relative to the teeth of the saw, and a plurality of adjustments may easily be made for the angle at which the device is to be operated relative to the longitudinal axis or plane of the saw.

What I claim and desire to secure by Letters Patent is:

1. In a saw sharpening device, a frame, means on the frame for mounting opposite ends of a file, a file, a member pivotally mounted on said frame, a gauge bar mounted in said member substantially transversely of said frame, adjustable means on said member alternately engageable with spaced portions of said frame respectively while in one adjusted position of said adjustable means upon pivoting said member in opposite directions for reversibly angularly positioning said gauge bar relative to said frame, and means for fixing said member and adjustable means in pivoted frame engaging position.

2. In a device of the character described, a file, a frame, a seat on the frame mounting one end of the file, said file being rotatable relative to said seat on the longitudinal axis of the file for adjusting a face of the file relative to a tooth of a saw to be sharpened, a setting member on the frame engageable with a portion of the file when the file is in said adjusted position, and gripping means on the frame engageable with the file to maintain the same in adjusted position, said gripping means being releasable relative to the file to allow rotation of the file, said setting member when the file is so rotated being engageable with another portion of the file to set the file in adjusted position relative to another tooth of said saw.

HENRY C. THOMAS.